(12) United States Patent
Mullins

(10) Patent No.: US 9,535,496 B2
(45) Date of Patent: Jan. 3, 2017

(54) VISUAL GESTURES

(71) Applicant: DAQRI, LLC, Los Angeles, CA (US)

(72) Inventor: Brian Mullins, Garden Grove, CA (US)

(73) Assignee: DAQRI, LLC, Los Angeles, CA (US)

( * ) Notice: Subject to any disclaimer, the term of this patent is extended or adjusted under 35 U.S.C. 154(b) by 272 days.

(21) Appl. No.: 13/840,268

(22) Filed: Mar. 15, 2013

(65) Prior Publication Data

US 2014/0267012 A1     Sep. 18, 2014

(51) Int. Cl.
*G09G 5/00* (2006.01)
*G06F 3/01* (2006.01)

(52) U.S. Cl.
CPC .............. *G06F 3/013* (2013.01); *G06F 3/017* (2013.01)

(58) Field of Classification Search
CPC ...................... G02B 27/017; G02B 2027/0174; G02B 2027/0178; G06F 3/013; G06F 3/017
See application file for complete search history.

(56) References Cited

U.S. PATENT DOCUMENTS

| | | | |
|---|---|---|---|
| 2003/0020707 A1* | 1/2003 | Kangas .................... | G06F 3/011 345/418 |
| 2008/0266323 A1* | 10/2008 | Biocca et al. ................. | 345/633 |
| 2010/0045869 A1 | 2/2010 | Baseley et al. | |
| 2010/0205043 A1 | 8/2010 | Edwards | |
| 2010/0241998 A1 | 9/2010 | Latta et al. | |
| 2010/0287511 A1 | 11/2010 | Meier et al. | |
| 2012/0038671 A1* | 2/2012 | Min et al. ...................... | 345/633 |
| 2012/0105486 A1* | 5/2012 | Lankford ................ | G06F 3/013 345/661 |
| 2012/0131435 A1* | 5/2012 | Douris ................ | H04L 12/6418 715/230 |
| 2013/0050432 A1* | 2/2013 | Perez ................. | H04N 13/0278 348/47 |

FOREIGN PATENT DOCUMENTS

| | | |
|---|---|---|
| WO | WO-2012132334 A1 | 10/2012 |
| WO | WO-2014151031 A2 | 9/2014 |
| WO | WO-2014151031 A3 | 9/2014 |

OTHER PUBLICATIONS

"International Application Serial No. PCT/US2014/024796, International Search Report mailed Sep. 15, 2014", 3 pgs.
"International Application Serial No. PCT/US2014/024796, Written Opinion mailed Sep. 15, 2014", 8 pgs.

* cited by examiner

*Primary Examiner* — Ilana Spar
*Assistant Examiner* — Brent D Castiaux
(74) *Attorney, Agent, or Firm* — Schwegman Lundberg & Woessner, P.A.

(57) ABSTRACT

Visual gestures in a device allow a user to select and activate features in a display of the device. A visual reference on a physical object is identified. A visualization of a virtual object engaged with an image of the physical object is generated in a display of a device. The virtual object corresponds to the visual reference. A rendering of the visualization of the virtual object is based a position of the display relative to the visual reference. A focus area in the display and a feature of the object are determined. A state of the feature is changed when the feature is in the focus area of the display.

17 Claims, 9 Drawing Sheets

VISUAL GESTURES

TECHNICAL FIELD

The subject matter disclosed herein generally relates to the processing of data. Specifically, the present disclosure addresses systems and methods for visual gestures.

BACKGROUND

User interfaces on mobile devices with touchscreen often require the use of tapping, swiping, or otherwise to activate features in applications. Some applications on mobile devices typically require the user to interact with the touchscreen with the user's fingers or stylus to provide input to the applications. When viewing content on a mobile device while holding the mobile device with both hands such as when taking a picture, the user is required to remove one hand from the mobile device to activate a command such as by tapping a shutter button on an application.

BRIEF DESCRIPTION OF THE DRAWINGS

Some embodiments are illustrated by way of example and not limitation in the figures of the accompanying drawings.

DETAILED DESCRIPTION

Example methods and systems are directed to visual gestures. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

"Visual gestures" in a device allow a user to select and activate features in a display of the device without the user having to use his hands to tap on a display of the device. For example, the user makes a "visual gesture" by physically moving and reorienting the device, while the device's camera is displaying real-time images captured from the rear-facing camera of the device. Since the device is overlaying a depicted physical object with a generated virtual object and its features, the physical motions and re-orientations of the device results in a gesture that moves one of the features into the focus area of the display and may result in an action being generated.

A visual reference on a physical object may be identified. A visualization of a virtual object engaged with a real time image of the physical object is generated in a display of a device. The virtual object may be based on the visual reference. A rendering of the visualization of the virtual object may be based a position of the display relative to the visual reference. A focus area in the display and a feature of the virtual object are determined. A state of the feature is changed when the feature is in the focus area of the display.

Figure 1:
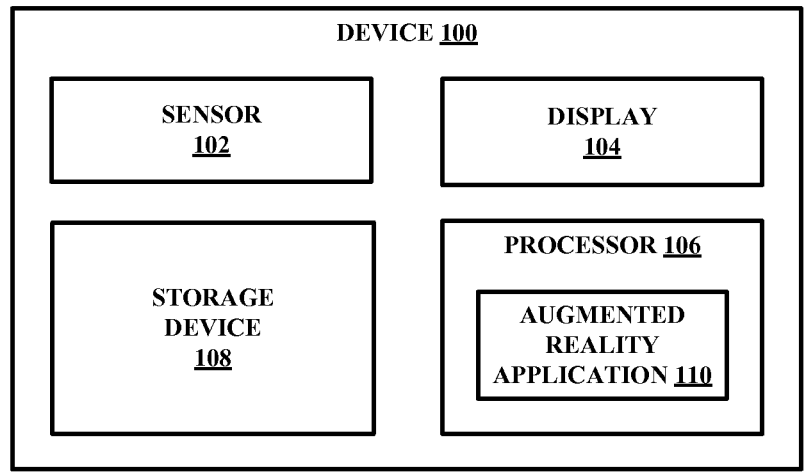
FIG. 1 is a device suitable for enabling selection of content based on visual gestures on the device, according to some example embodiments.

FIG. 1 is a block diagram illustrating a device 100 suitable for enabling selection of content based on visual gestures on the device, according to some example embodiments. The device 100 may include sensors 102, a display 104, a processor 106, and a storage device 108. For example, the device 100 may be a desktop computer, a vehicle computer, a tablet computer, a navigational device, a portable media device, or a smart phone of a user. The user may be a human user (e.g., a human being), a machine user (e.g., a computer configured by a software program to interact with the device 100), or any suitable combination thereof (e.g., a human assisted by a machine or a machine supervised by a human).

The sensors 102 may include, for example, an optical sensor (e.g., a charged-coupled device (CCD)), an orientation sensor (e.g., gyroscope), an audio sensor (e.g., a microphone). For example, the device 100 may include a front-facing camera for tracking an eye movement of the user, and a rear-facing camera for capturing a picture or a video of a physical object (or another displayed virtual object). It is noted that the sensors described herein are for illustration purposes and the sensors 102 are thus not limited to the one described.

The display 104 may include, for example, a touchscreen display configured to receive a user input via a contact on the touchscreen display. In another example, the display 104 may include a screen or monitor configured to display images generated by the processor 106.

The processor 106 may include an augmented reality application 110 configured to generate a visualization of a virtual object (three-dimensional or two-dimensional) overlaid on an image of a physical object captured by the camera of the device 100 in a display of the device 100. The visualization of the virtual object may be manipulated (e.g., by the user) by adjusting a position of the physical object relative to the camera lens of the device 100. Similarly, the visualization of the three-dimensional virtual object may be manipulated (e.g., by the user) by adjusting a position camera lens of the device 100 relative to the physical object.

In one embodiment, the augmented reality application 110 identifies a visual reference on the physical object and tracks the location of the visual reference within the display 104 of the device 100. The visual reference may also be referred to as a marker and may consist of an identifiable image, symbol, letter, number, machine-readable code. For example, visual reference may include a bar code, a quick response (QR) code, or an image that has been previously associated with the three-dimensional virtual object.

The augmented reality application 110 generates and displays a visualization of the virtual object engaged with an image or picture of the physical object. The virtual object may be generated based on the visual reference. In other words, each virtual object may correspond to a unique visual reference (e.g., unique to that virtual object within the augmented reality application 110). The augmented reality application 110 renders the visualization of the virtual object based a position and an orientation of the device 100 relative to the visual reference in the physical object.

The augmented reality application 110 determines a focus area in the display 104. The focus area in the display 104 may correspond to a predefined area in the display 104. The predefined area may trigger an action or a change of state in a feature of the three-dimensional virtual object in the display 104. The feature may change state when the feature is present in the focus area of the display. The focus area may be predefined by the augmented reality application 110 or may be customized and defined by a user of the device 100.

The storage device 108 may be configured to store a database of visual references, virtual objects corresponding to the visual references, and features of the virtual objects corresponding to the virtual objects, where the features of the virtual objects can change state when the features are present in the focus area of the display 104. For example, the visual reference may include a machine-readable code or a previously identified image (e.g., a picture of shoe). The previously identified image of the show may correspond to a three-dimensional virtual shoe that can be viewed from different angles by manipulating the position of the device 100 relative to the picture of the shoe. Features of the three-dimensional virtual shoe may include selectable icons on the three-dimensional virtual shoe. An icon may be selected or activated by moving (e.g., repositioning, reorienting, or both) the device 100 to display the icon within a focus area of the display 104. For example, the focus area may be a central area of the display 104, a corner of the display 104, an edge of the display 104, or any suitable combination thereof.

In one embodiment, the device 100 may communicate over a network (not shown) with a server (not shown) to retrieve a portion of the database of visual references, corresponding three-dimensional virtual objects, and corresponding features of the three-dimensional virtual objects. The network may be any network that enables communication between or among machines, databases, and devices (e.g., the device 100). Accordingly, the network may be a wired network, a wireless network (e.g., a mobile or cellular network), or any suitable combination thereof. The network may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 2:
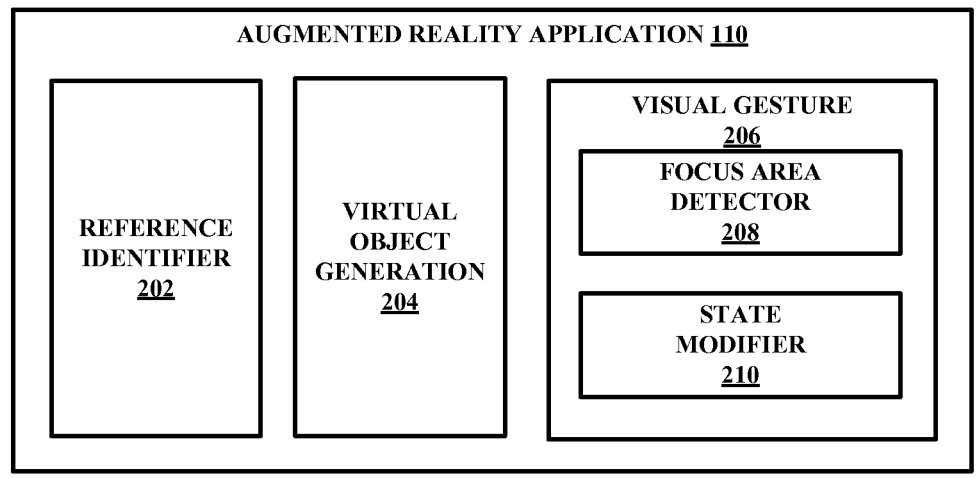
FIG. 2 is a block diagram illustrating modules (e.g., components) of a visualization application in the device, according to some example embodiments.

FIG. 2 is a block diagram illustrating modules (e.g., components) of the augmented reality application 110 in the device 100, according to some example embodiments. The augmented reality application 110 may include a reference identifier module 202, a virtual object generation module 204, and a visual gesture module 206.

The reference identifier module 202 identifies a visual reference on a physical object captured by the sensor 102 of the device 100. For example, a camera of the device 100 captures an image of a physical object, such as a page on a newspaper. The page on the newspaper may include an article and a picture. The picture may have been already identified as a visual reference in the storage device 108. The picture may be associated with a corresponding three-dimensional model of an object.

The virtual object generation module 204 generates and displays a visualization of a three-dimensional virtual object engaged with an image of the physical object captured by the sensor 102 of the device 100. The virtual object may be based on the visual reference. In one embodiment, each virtual object may be uniquely associated with a visual reference. The virtual object generation module 204 renders the visualization of the virtual object based a position of the device 100 relative to the visual reference.

The visual gesture module 206 may determine a focus area in the display 104 and a feature of the virtual object. For example, those features may include points of interest or user-interactive objects on a three-dimensional virtual object. For example, the three-dimensional virtual object may include a three-dimensional floor plan with icons corresponding to points of interest in the three-dimensional floor plan. An icon located in a room represented in the three-dimensional floor plan may be activated to generate more information (size of the room, description of the room, etc.) about the corresponding room. The icon may be activated by the user tapping on the representation of the icon on the display 104.

In one embodiment, the visual gesture module 206 may change a state of the feature or activate the feature when the feature is in the focus area of the display. For example, the focus area may be set as a center area in the display 104. Using the previous example, the user may move the device 100 so that the icon of a room of interest may be displayed in the center area in the display 104. The visual gesture module 206 may change the color or shape of the icon to indicate the user that the icon has been selected. Furthermore, if the user maintains the icon in the center area of the display 104 for at least a predetermined amount of time (e.g., a few seconds), the icon may change state or otherwise be activated to initiate an action corresponding to taping on the icon. For example, a dialog box may be generated in the display to provide a description of the room selected by the user.

In another embodiment, the visual gesture module 206 includes a focus area detector 208 and a feature state modifier 210. The focus area detector 208 detects a presence of the feature of the virtual object in the focus area of the display 104. In another embodiment, the focus area detector 208 may track an eye movement of the user looking at the device 100 to determine a specific area in the display where the user is looking at. For example, the focus area detector 208 may determine based on a motion, an orientation, and a position of the device 100 relative to the user and the physical object that the user is looking at a particular area in the display 104. The focus area detector 208 may also use one or more camera lenses in the device facing the user to extrapolate the position and a movement of the eyes of the user and thus the corresponding area on the display 104 at which the user is looking.

The feature state modifier 210 may be configured to change a state of the feature when the feature is present in the focus area of the display 104. For example, the feature state modifier 210 may activate a feature corresponding to an area that the user is looking at using the eye tracking feature previously described.

Figure 3:
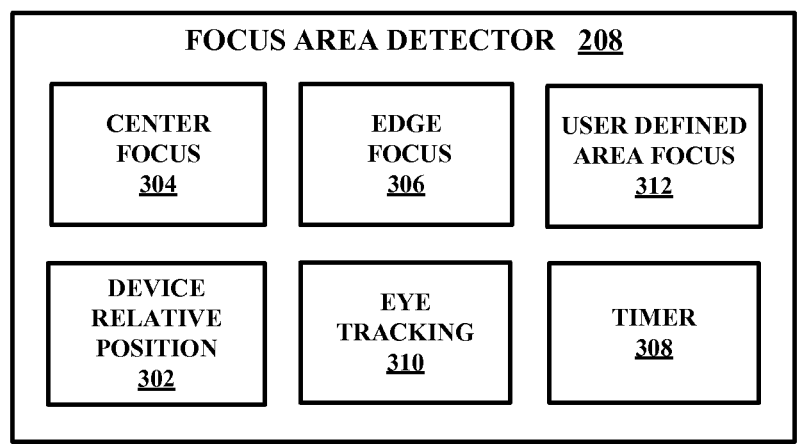
FIG. 3 is a block diagram illustrating modules (e.g., components) of a focus area detector of the visualization application, according to some example embodiments.

FIG. 3 is a block diagram illustrating modules (e.g., components) of a focus area detector 208 of the visual gesture module 206, according to some example embodiments. The focus area detector 208 may include a device relative position module 302, a center focus module 304, an edge focus module 306, a timer module 308, an eye tracking module 310, and a user-defined area focus module 312.

The device relative position module 302 may be configured to detect the position and the orientation of the device relative to the visual reference on the physical object by using the sensor 102. For example, a gyroscope may determine the orientation and position of the device 100. A camera can be used to determine the aim and angle of the device 100 relative to the visual reference. In other words, the device relative position module 302 determines how far or how close the device 100 is to the visual reference and how the device 100 is aimed at the visual reference.

In another embodiment, the device relative position module 302 detects an orientation of the device. For example, the device relative position module 302 may detect whether the device 100 is held in a landscape mode or portrait mode. The location of the focus area may depend on whether the device 100 is held in landscape mode or portrait mode. Further, features of the three-dimensional virtual object may be enabled or disabled based on whether the device 100 is held in landscape mode or portrait mode.

The center focus module 304 may be configured to define the focus area of the display 104 in the center of display 104. For example, the center focus module 304 may be configured to define an area in about the center of the display 104 as the focus area. The area may be in the shape of a circle, oval, or any other shape. The area may be predefined by the visual gesture module 206 or may be customized based on a user selection. For example, the user may be able to move the focus area to another area in the display 104.

The edge focus module 306 may be configured to define the focus area of the display 104 at an edge of the display 104. For example, the edge focus module 306 may be configured to define an area at an edge or in a corner of the display 104 as the focus area. The area may be in the shape of a circle, oval, or any other shape. The area may also be predefined by the visual gesture module 206 or may be customized based on a user selection. For example, the user may be able to move the focus area to another area in the display 104.

The timer module 308 may be configured to measure the amount of time the device 100 has been pointed to the visual reference such that a feature of the virtual object is located within a focus area of the display 104.

The eye tracking module 310 may be configured to track an eye movement of the user looking at the device 100 to determine an area in the display of the device 100 where the user is looking at.

The user-defined area focus module 312 may be configured to enabled the user to defined and select any portion of area or any shape of area in the display 104 to be used a focus area.

Figure 4:
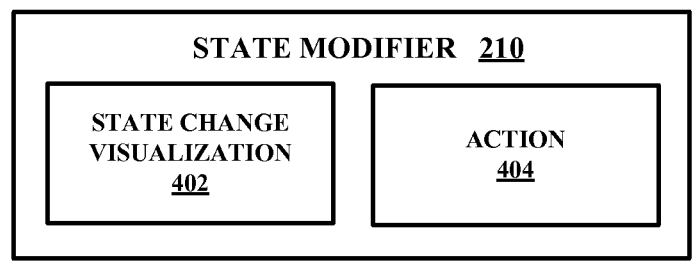
FIG. 4 is a block diagram illustrating modules (e.g., components) of a state modifier of the visualization application, according to some example embodiments.

FIG. 4 is a block diagram illustrating modules (e.g., components) of the feature state modifier 210 of the visual gesture module 206, according to some example embodiments. The feature state modifier 210 may be configured to change a state of a feature present in a focus area in the display 100 as previously described. For example, if the focus area is in a center area of the display 104, feature state modifier module 210 may change the color of the icon to indicate the user that the icon has been selected when the focus area detector 208 detects that the user has maintained the icon in the center area of the display 104 for at least a predetermined amount of time (e.g., a few seconds). In that case, the icon may change state or otherwise be activated to initiate an action corresponding to taping on the icon. For example, a dialog box may be generated in the display to provide a description of the room selected by the user The state modifier 210 may include a state change visualization module 402, and an action module 404. The state change visualization module 402 may be configured to change an icon in the focus area. For example, the color or shape of the icon may change, or the icon may be replaced with another icon or another user interface such as a notification box.

The action module 404 may be configured to trigger an action similar to tapping on the icon on the display 104. For example, the action module 404 may generate a message notification, a dialog box, a menu, or any other action triggered by the presence of the feature in the focus area in the display 104. In another embodiment, the action module 404 may be configured to generate a communication from the device 100 to another device, for example, via a wireless network.

Figure 5:
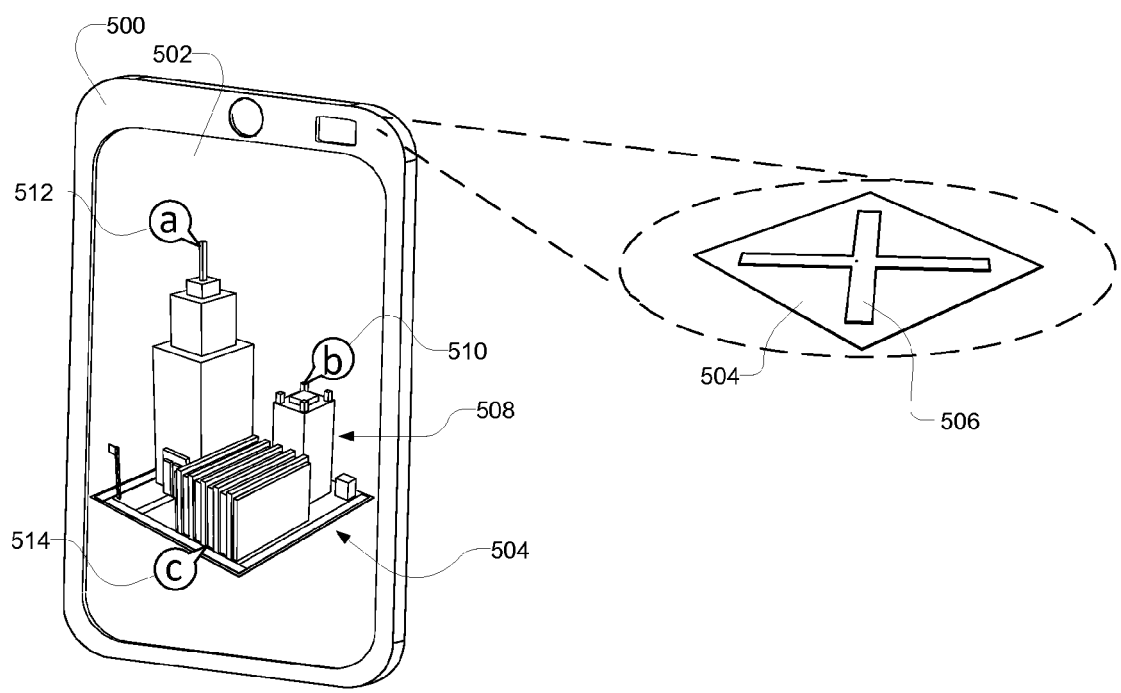
FIG. 5 is a block diagram illustrating an example of a visualization of a virtual object in the device recognizing a physical object, according to some example embodiments.

FIG. 5 is a block diagram illustrating an example of a visualization of a three-dimensional virtual object in the device capturing a visual reference, according to some example embodiments. A device 500 is pointed at a physical object 504 with a visual reference 506. As previously described, the visual reference 506 may include a picture, a machine-readable code, or any other identifier unique to the augmented reality application 110. The physical object 504 may be a page on a magazine or newspaper. In another embodiment, the physical object 504 and the visual reference 506 may be combined together. In such case, the three-dimensional physical object may be used as a visual reference. For example, a three-dimensional object such as a cup having a specific pattern or design may be used as a visual reference.

The device 500 captures a picture of the physical object 504 and the visual reference 506, and generates a visualization of a three-dimensional virtual object in a display 502 of the device 500. In particular, the device 500 generates the visualization of a three-dimensional virtual object engaged with a picture of the physical object 504. In the present example, a three-dimensional model of a building 508 is rendered on top of a picture of the physical object 504 in the display 502. In particular, the three-dimensional model of a building 508 may include points of interest icons 510, 512, 514. For example, the point of interest icon 510 may provide additional information corresponding to the location of the point of interest icon 510 relative the three-dimensional model of the building 508, when the point of interest icon 510 is triggered or otherwise selected.

Figure 6A:
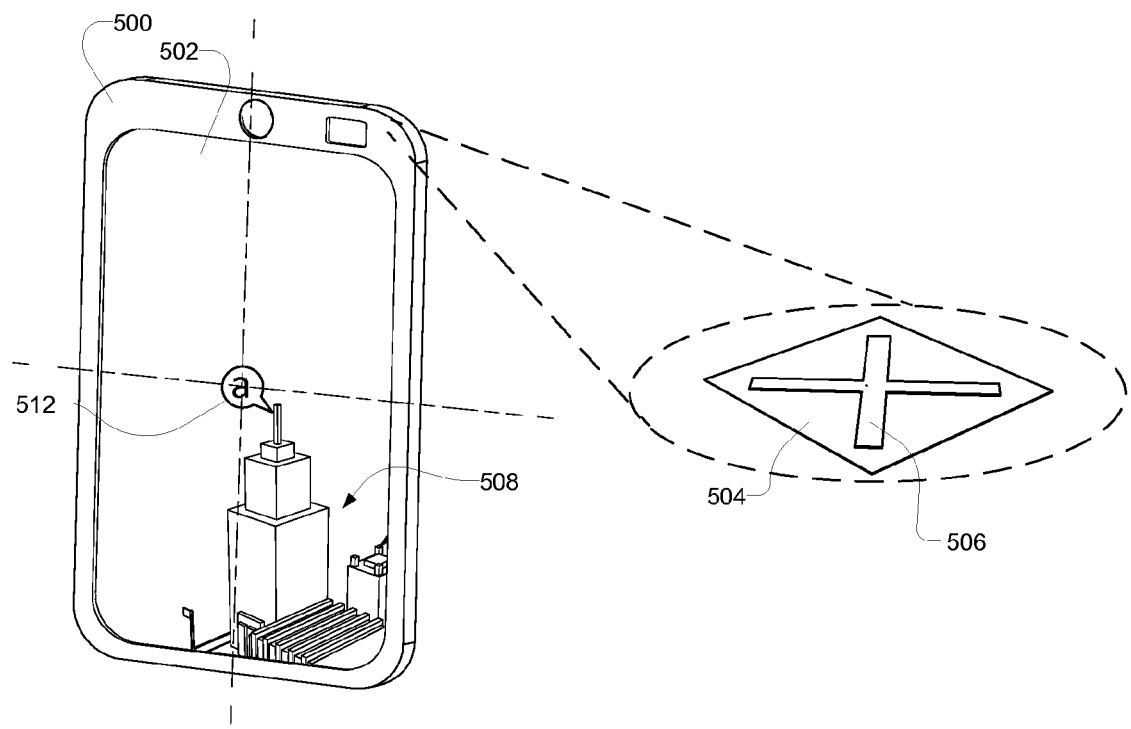
FIG. 6A is a block diagram illustrating an example of a visual gesture to focus on a feature of the virtual object in the device, according to some example embodiments.

FIG. 6A is a block diagram illustrating an example of a visual gesture to focus on a feature of the three-dimensional virtual object 508 in the display 502 of the device 500, according to some example embodiments. In this example, the user has positioned the device 500 relative to the physical object 504 such that the point of interest icon 512 is displayed in a central area of the display 502 of the device 500. In one embodiment, a state of the point of interest icon 512 may be changed to notify the user of the selection. For example, the color of the point of interest icon 510 may be changed to bring attention to a user of the device 500.

Figure 6B:
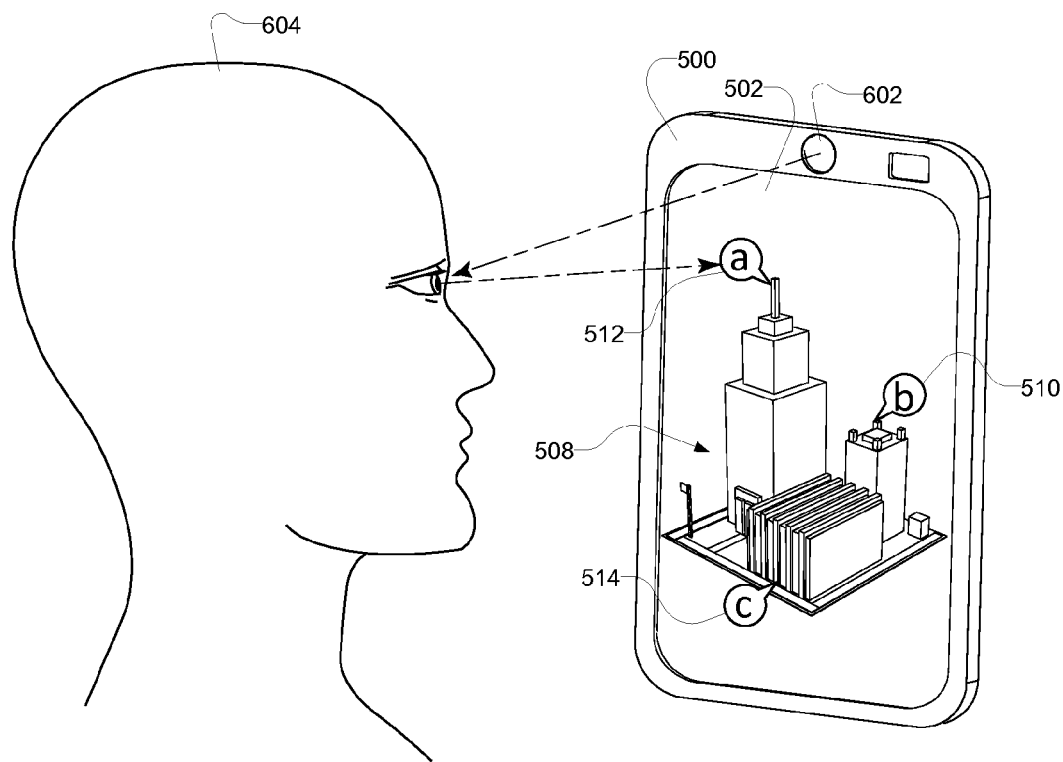
FIG. 6B is a block diagram illustrating another example of a visual gesture to focus on a feature of the virtual object in the device, according to some example embodiments.

FIG. 6B is a block diagram illustrating another example of a visual gesture to focus on a feature of the three-dimensional virtual object 508 in the display 502 of the device 500, according to some example embodiments. In this example, an optical lens 602 tracks an eye movement of the user 604 viewing the display 502 of the device 500 and determines the area on the display 502 corresponding to the user 604 is viewing. A point of interest icon corresponding to the area the user 604 is viewing. For example, the focus area detector 208 detects that the user 604 is viewing point of interest 512. In one embodiment, a state of the point of interest icon 510 may be changed to in response to the user 604 viewing the point of interest 512. For example, the color of the point of interest icon 512 may be changed to bring attention to a user of the device 500.

Figure 6C:
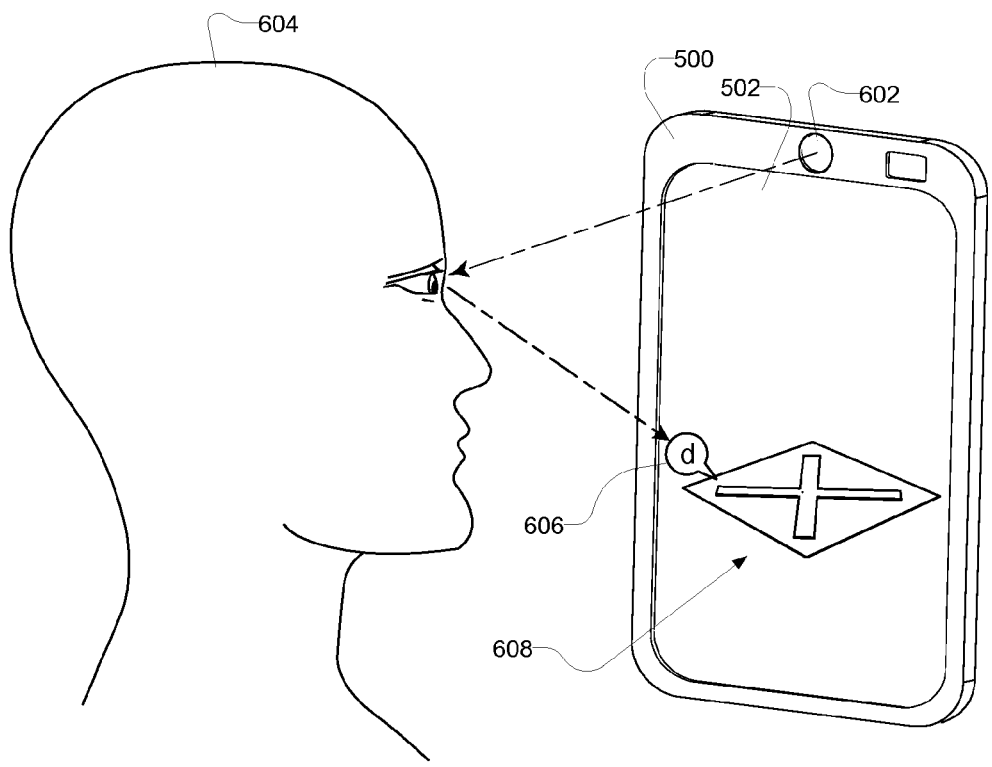
FIG. 6C is a block diagram illustrating an example of a visual gesture to enable an action on a pre-identified area on an image of a physical object, according to some example embodiments.

FIG. 6C is a block diagram illustrating another example of a visual gesture in the display 502 of the device 500, according to some example embodiments. In this example, an optical lens 602 tracks an eye movement of the user 604 viewing an image 608 of the physical object 504 in the display 502 of the device 500. The device 500 determines that the user 604 is looking at area 606 on the display 502. The area 606 corresponding to a preidentified location on the image 608 of the physical object 504. The preidentified location may include a point of interest on the image 608 of the physical object 504 is associated with area 606. For example, the device 500 detects that the user 604 is viewing the preidentified location on the image of the physical object 504 for a few seconds. In one example, a dialog box showing more information about that particular area 606 that the user 604 has been staring at, may be displayed. In another example, the device 500 may generate any other action associated with the preidentified location 606 on the image 608 of the physical object 504.

In another embodiment, the device 500 may include a transparent display (not shown) that may be used to identify a physical object or a particular location on the physical object. In one example, the transparent display may be mounted to a head of the user (e.g., via eyeglass mount or headgear mount). In another example, the transparent display may be a handheld device that the user holds and looks through to see a physical object behind the transparent display. A rear facing camera of the device 500 may recognize physical objects being looked by the user (e.g., by comparing an image of the physical object with a reference image). In particular, the position and orientation of the transparent display with respect to the user and the physical object may be used to determine a line of sight of the user. Using the determined line of the sight of the user, the device can identify in real time the physical objects being looked and in particular which part of the physical object is being looked.

Once the device 500 identifies that the recognized physical object or the part of the recognized physical object corresponds to a preidentified physical object or preidentified part of the physical object, the device may trigger a corresponding action (e.g., sending an email, generating a sound, etc.). For example, the device 500 detects the user 604 looking through the transparent display to a bottom part of a TV. The device 500 recognizes the TV and determines that the bottom part of the TV (being look at by the user 906) is associated with an action corresponding to generating a communication to the TV to switch the TV on or off. If the user 906 has looked at the bottom part of the TV for at least several seconds, the device generates a corresponding message to activate or deactivate the TV.

Figure 7:
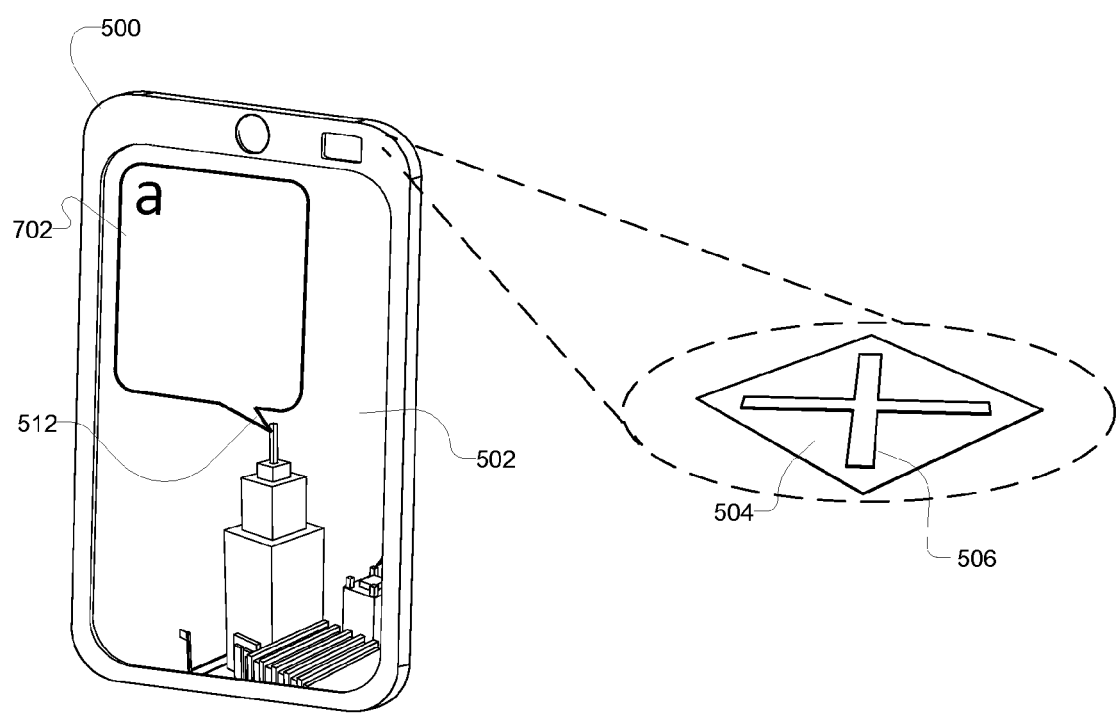
FIG. 7 is a block diagram illustrating an example of a visual gesture to trigger a change in a state of a feature of the virtual object in the device, according to some example embodiments.

FIG. 7 is a block diagram illustrating an example of a visual gesture to trigger a change in a state of a feature of the three-dimensional virtual object 508 in the display 502 of the device 500, according to some example embodiments. For example, if the device 500 detects that the point of interest icon 510 has been present in the focus area (e.g., central area) of the display 502 for at least a predetermined amount of time, an action is triggered to change a state of the point of interest icon 510. For example, a dialog box 702 may pop up, or another action (e.g., playing a media file, saving the point of interest 512, emailing a description) corresponding to the point of interest icon 512 may be displayed on the device 500.

Figure 8:
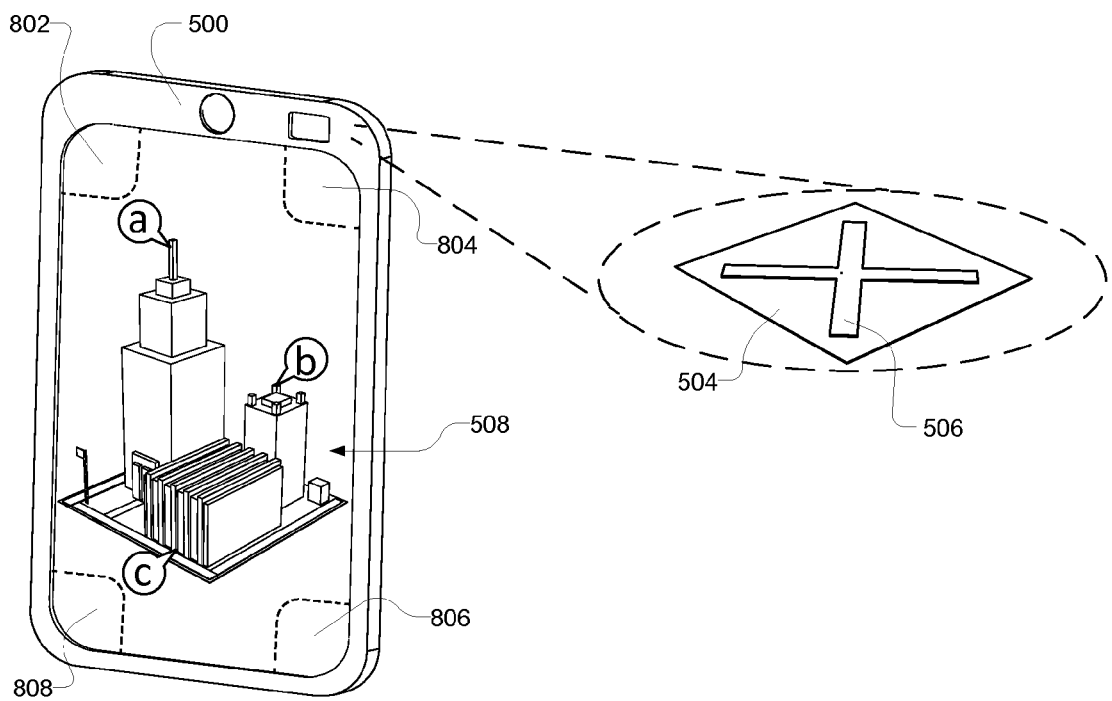
FIG. 8 is a block diagram illustrating an example of a visual gesture to focus on a feature of the virtual object in the device, according to some example embodiments.

FIG. 8 is a block diagram illustrating an example of a visual gesture to focus on a feature of the three-dimensional object in the device, according to some example embodiments. For example, the focus areas of the device 500 may be located in the corners 802, 804, 806, 808 of the device 500. Each corner may be associated with a corresponding action (e.g., triggering an action such as saving a point of interest).

Figure 9:
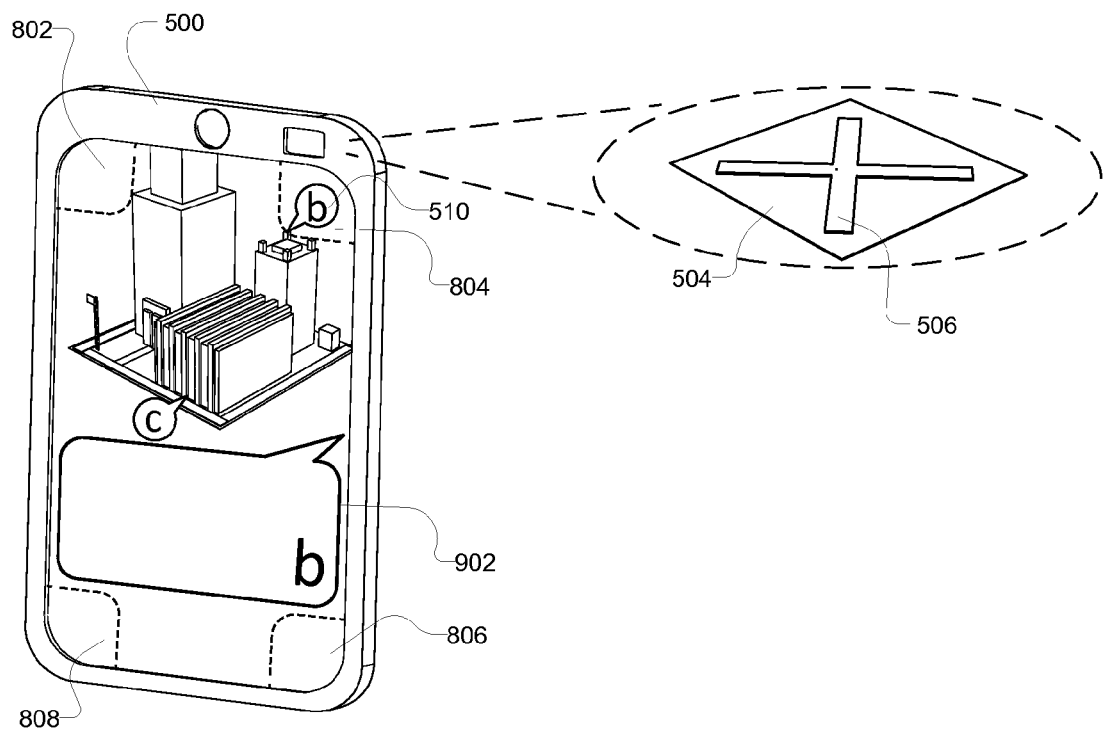
FIG. 9 is a block diagram illustrating an example of a visual gesture to trigger a change in a state of a feature of the virtual object in the device, according to some example embodiments.

FIG. 9 is a block diagram illustrating an example of a visual gesture to trigger a change in a state of a feature of the three-dimensional object in the device, according to some example embodiments. For example, because the point of interest icon 510 is within the focus area of corner 802 for at least a few seconds, the augmented reality application 110 may generate a dialog box 902 to provide a description associated with the point of interest icon 510. As such, the user of the device 500 is able to generate actions related to the three-dimensional object in the device without having to tap on the screen or display of the device 500.

Figure 10A:
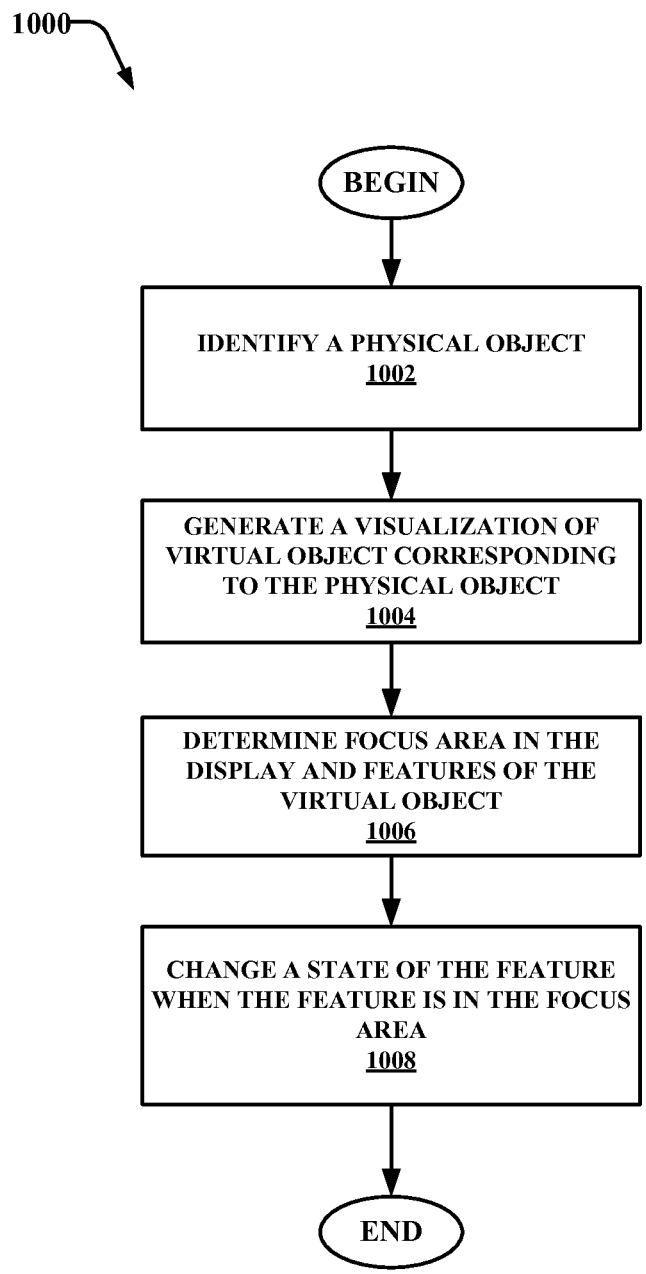
FIG. 10A is a flowchart illustrating an example operation of the visualization application of a device in performing a method to enable a visual gesture on the device, according to some example embodiments.

FIG. 10A is a flowchart illustrating an example operation of the visualization application of a device in performing a method 1000 for a visual gesture on the device, according to some example embodiments. In operation 1002, an image of a physical object captured the device is recognized or identified. In one embodiment, the reference identifier module 202 identifies a visual reference on a physical object.

In operation 1004, the virtual object generation module 204 generates and displays a visualization of a virtual object engaged (e.g., overlaid on top of) with an image of the physical object. The virtual object corresponds to the visual reference. In one embodiment, the virtual object generation module 204 renders the visualization of virtual object based a position of the display relative to the visual reference.

In operation 1006, the visual gesture module 206 determines a focus area in the display and a feature of the virtual object. The visual gesture module 206 changes a state of the feature in response to the feature being in the focus area of the display.

In one embodiment, the reference identifier module 202 and the visual gesture module 206 store in a storage device of the device, a database of visual references, corresponding virtual objects, corresponding features of the virtual objects. The features of the virtual objects change state in response being in the focus area of the display.

In one embodiment, the visual gesture module 206 changes the state of the feature in response to the feature being located within a predefined portion of the display. The focus area corresponds to the predefined portion of the display.

In one embodiment, the predefined portion of the display comprises an area central to the display, an area adjacent to an edge of the display, an area adjacent to a corner of the display, or a user-defined area.

In one embodiment, the visual gesture module 206 changes the state of the feature in response to the feature being located within the predefined portion of the display for a time duration exceeding a time threshold.

In one embodiment, the visual gesture module 206 detects a presence of the feature of the three-dimensional virtual object in the focus area of the display, and changes a state of the feature when the feature is present in the focus area.

In one embodiment, the visual gesture module 206 replaces a first component of the three-dimensional virtual object in the focus area with a second component of the three-dimensional virtual object in the focus area. The feature may include an interactive object that changes state when the interactive object is in the focus area. For example, interactive object may change color when the interactive object is in the focus area.

Figure 10B:
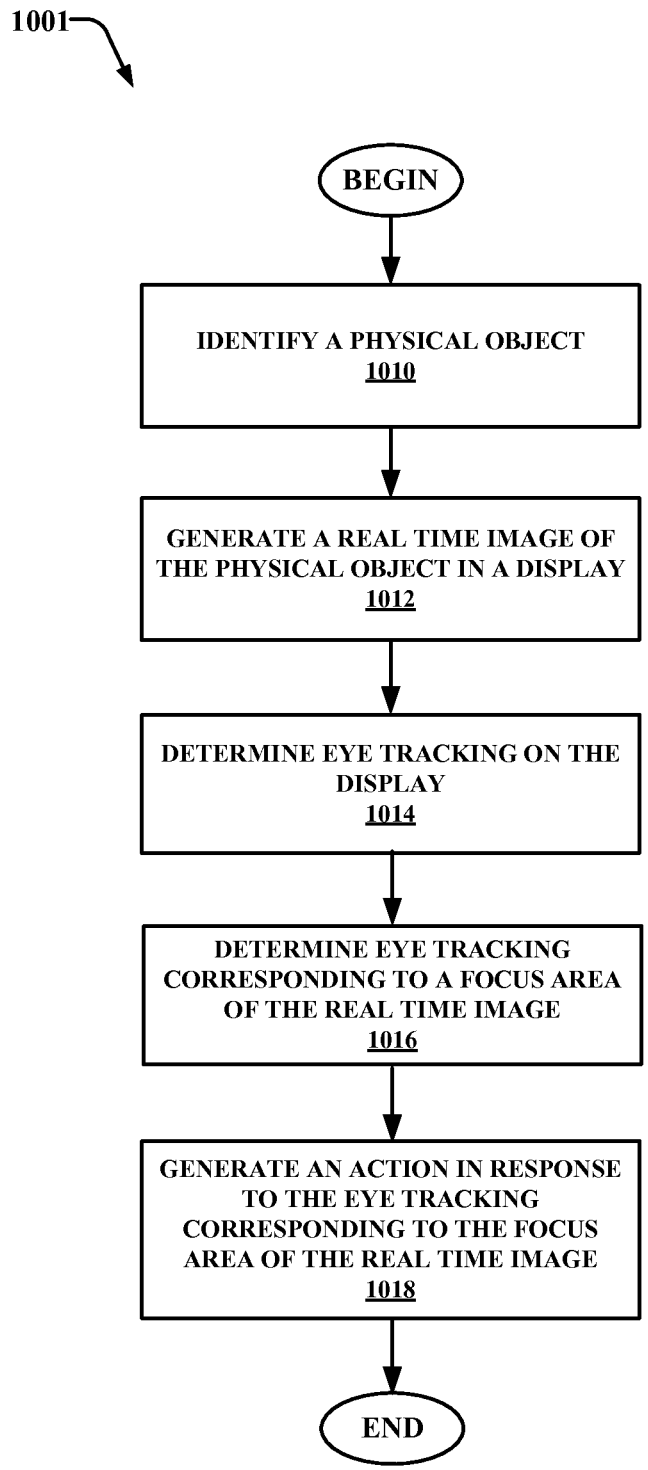
FIG. 10B is a flowchart illustrating an example operation of the visualization application of a device in performing a method to enable a visual gesture on the device, according to some example embodiments.

FIG. 10B is a flowchart illustrating an example operation of the visualization application of a device in performing a method 1001 for a visual gesture on the device, according to some example embodiments. In operation 1010, an image of a physical object captured the device is recognized or identified. In one embodiment, the reference identifier module 202 identifies a visual reference on a physical object.

In operation 1012, an image of the physical object is displayed in real-time the display of the device.

In operation 1014, the device determines an eye tracking movement of the user on the display.

In operation 1016, the device determine whether the eyes of the user are looking at a focus area (or predefined area) of the real time image.

In operation 1018, an action is generated in response to detecting that the user has been staring at the focus area for at least some time. The action is generated based on the focus area.

Figure 11:
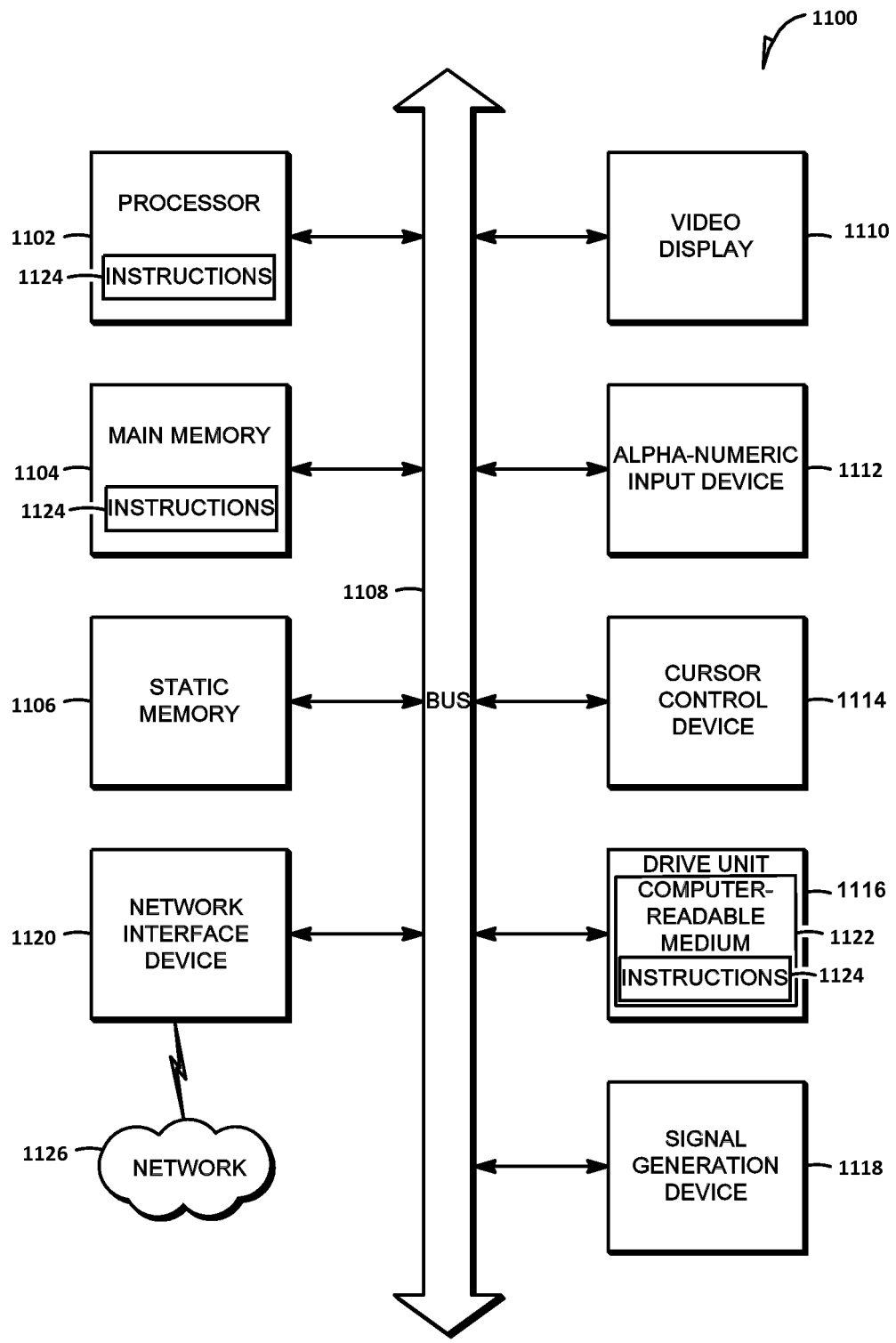
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 11 shows a diagrammatic representation of the machine 1100 in the example form of a computer system and within which instructions 1124 (e.g., software, a program, an application, an applet, an app, or other executable code) for causing the machine 1100 to perform any one or more of the methodologies discussed herein may be executed, in whole or in part. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform all or part of any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 190) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A device comprising:
a display;
a camera configured to generate an image that depicts a physical object; and
a virtual gesture application implemented by a hardware processor of the device and configured to perform operations comprising:
identify a visual reference on the physical object,
generate a virtual object corresponding to the visual reference,
rendering the virtual object in the display based a position of the display relative to the visual reference,
identifying a first and a second trigger area in the display, the first trigger area including a first predefined static area of the display, the second trigger area including a second predefined static area of the display, the first predefined static area being distinct from the second predefined static area,
determining that an interactive feature of the virtual object is located inside the first or second trigger area,
performing a first action on the interactive feature in response to the interactive feature being located inside the first trigger area and a second action on the interactive feature in response to the interactive feature being located inside the second trigger area, the first action being distinct from the second action.

2. The device of claim 1, further comprising:
a storage device coupled to the processor, the storage device comprising a database configured to store visual references, virtual objects that correspond to the visual references, and features of the virtual objects, the features of the virtual objects being configured to change state when located in the first and second trigger area.

3. The device of claim 1, wherein the first trigger area includes a first corner area of the display, the second trigger area includes a second corner area that is distinct from the first corner area.

4. The device of claim 3, wherein the first trigger area includes an area located in the center of the display.

5. The device of claim 1, wherein the first action is performed on the interactive feature in response to the interactive feature being located inside the first trigger area for a time duration exceeding a time threshold.

6. The device of claim 1,
wherein the first action is performed on the virtual object in response to the interactive feature being located inside the first trigger area, and the second action is performed on the virtual object in response to the interactive feature being located inside the second trigger area.

7. The device of claim 1,
wherein the first action includes replacing a first component of the virtual object with a second component of the virtual object in response to the interactive feature being located inside the first trigger area, and the second action includes replacing a third component of the virtual object with a fourth component of the virtual object in response to the interactive feature being located inside the second trigger area.

8. The device of claim 1,
wherein the first action causes the interactive feature to change to a first state in response to the interactive feature being located inside the first trigger area, and the second action causes the interactive feature to change to a second state in response to the interactive feature being located inside the second trigger area.

9. A computer-implemented method comprising:
identifying a visual reference on an image that depicts a physical object;
generating a virtual object corresponding to the visual reference;
rendering the virtual object in a display of a device based on a position of the display relative to the visual reference;
identifying a first and a second trigger area in the display, the first trigger area including a first predefined static area of the display, the second trigger area including a second predefined static area of the display, the first predefined static area being distinct from the second predefined static area;
determining that an interactive feature of the virtual object is located inside the first or second trigger area;
performing a first action on the interactive feature in response to the interactive feature being located inside the first trigger area; and
performing a second action on the interactive feature in response to the interactive feature being located inside the second trigger area.

10. The computer-implemented method of claim 9, further comprising:
storing, in a database, visual references, virtual objects that correspond to the visual references, and features of the virtual objects, the features of the virtual objects being configured to change state when located in the first and second trigger area.

11. The computer-implemented method of claim 9, wherein the first trigger area includes a first corner area of the display, the second trigger area includes a second corner area that is distinct from the first corner area.

12. The computer-implemented method of claim 11, wherein the first trigger area includes an area located in the center of the display.

13. The computer-implemented method of claim 9, wherein the first action is performed on the interactive feature in response to the interactive feature being located inside the first trigger area for a time duration exceeding a time threshold.

14. The computer-implemented method of claim 9, wherein the first action is performed on the virtual object in response to the interactive feature being located inside the first trigger area, and the second action is performed on the virtual object in response to the interactive feature being located inside the second trigger area.

15. The computer-implemented method of claim 9, wherein the first action includes replacing a first component of the virtual object with a second component of the virtual object in response to the interactive feature being located inside the first trigger area, and the second action includes replacing a third component of the virtual object with a fourth component of the virtual object in response to the interactive feature being located inside the second trigger area.

16. The computer-implemented method of claim 14, wherein the first action causes the interactive feature to change to a first state in response to the interactive feature being located inside the first trigger area, and the second action causes the interactive feature to change to a second state in response to the interactive feature being located inside the second trigger area.

17. A non-transitory machine-readable medium comprising instructions that, when executed by one or more processors of a machine, cause the machine to perform operations comprising:
   identifying a visual reference on an image that depicts a physical object;
   generating a virtual object corresponding to the visual reference;
   rendering the virtual object in a display of a device based on a position of the display relative to the visual reference;
   identifying a first and a second trigger area in the display, the first trigger area including a first predefined static area of the display, the second trigger area including a second predefined static area of the display, the first predefined static area being distinct from the second predefined static area;
   determining that an interactive feature of the virtual object is located inside the first or second trigger area;
   performing a first action on the interactive feature in response to the interactive feature being located inside the first trigger area; and
   performing a second action on the interactive feature in response to the interactive feature being located inside the second trigger area.

* * * * *